(12) United States Patent
Gemelos et al.

(10) Patent No.: US 7,592,936 B2
(45) Date of Patent: Sep. 22, 2009

(54) INPUT DISTRIBUTION DETERMINATION FOR DENOISING

(75) Inventors: George Gemelos, Cupertino, CA (US); Erik Ordentlich, San Jose, CA (US); Gadiel Seroussi, Cupertino, CA (US); Marcelo Weinberger, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 550 days.

(21) Appl. No.: 11/590,436

(22) Filed: Oct. 30, 2006

(65) Prior Publication Data

US 2007/0133898 A1  Jun. 14, 2007

Related U.S. Application Data

(63) Continuation-in-part of application No. 11/180,066, filed on Jul. 12, 2005, now Pat. No. 7,271,749.

(51) Int. Cl.
*H03M 7/00* (2006.01)
(52) U.S. Cl. .................. 341/107; 375/345; 375/346; 382/232; 341/51; 341/77
(58) Field of Classification Search .......... 341/50, 341/51, 107; 375/345; 382/232; 714/704, 714/755
See application file for complete search history.

(56) References Cited

U.S. PATENT DOCUMENTS

| | | | | |
|---|---|---|---|---|
| 5,768,533 | A * | 6/1998 | Ran | 709/247 |
| 6,480,552 | B1 * | 11/2002 | Tonello | 375/265 |
| 6,542,644 | B1 * | 4/2003 | Satoh | 382/246 |
| 7,047,472 | B2 * | 5/2006 | Weissman et al. | 714/746 |
| 7,095,344 | B2 * | 8/2006 | Sekiguchi et al. | 341/107 |
| 7,120,308 | B2 * | 10/2006 | Guleryuz | 382/254 |
| 7,133,808 | B2 * | 11/2006 | Radulovic et al. | 702/189 |
| 7,433,427 | B2 * | 10/2008 | Ordentlich et al. | 375/316 |
| 7,434,146 | B1 * | 10/2008 | Verdu et al. | 714/780 |
| 2004/0161153 | A1 | 8/2004 | Lindenbaum | |
| 2005/0097421 | A1 * | 5/2005 | Weissman et al. | 714/746 |
| 2005/0131660 | A1 * | 6/2005 | Yadegar et al. | 703/2 |
| 2005/0135700 | A1 * | 6/2005 | Anderson | 382/261 |

OTHER PUBLICATIONS

Weissman et al., Universal Discrete Denoising: Known Channel, IEEE Transactions on Infromation Theory, vol. 51, No. 1, Jan. 2005.

Gemelos et al., Altorithms for Discrete Denoising Under Channel Uncertainty, arXiv:cs.IT/0508060 v1, Aug. 2005.

Weinberger et al., "Applications of Universal Context Modeling to Lossles Compression of Gray-Scale Images," Proc. Conf. on Signals, Systems and Computers-vol. 2, 1995.

(Continued)

*Primary Examiner*—Linh V Nguyen

(57) ABSTRACT

A denoising process or system uses convex optimization to determine characteristics of a clean signal. In one embodiment, a noisy signal that represents a set of symbols can be scanned to determine an empirical vector with components respectively indicating respective empirical probabilities of symbols in the noisy signal that occur in a particular context. A convex optimization process can then identify a vector such that a difference between the empirical vector and a product of the identified vector and a channel matrix is minimized. The identified vector can be used to determine when a symbol in the noisy signal should be replaced when assembling a reconstructed signal.

12 Claims, 4 Drawing Sheets

OTHER PUBLICATIONS

Weissman et al., Universal Discrete Denoising: Known Channel, HP Labs Technical Report -HPL-2003-29, Feb. 10, 2003.

Weissman et al., Universal Discrete Denoising, Proc. of the Information Theory Workshop, Oct. 2002.

* cited by examiner

INPUT DISTRIBUTION DETERMINATION FOR DENOISING

CROSS-REFERENCE TO RELATED APPLICATIONS

This patent document is a continuation-in-part and claims benefit of the earlier filing date of U.S. patent application Ser. No. 11/180,066 filed Jul. 12, 2005, now U.S. Pat. No. 7,271,749 entitled "Context-Based Denoiser That Simultaneously Updates Probabilities For Multiple Contexts," having common inventors and which is hereby incorporated by reference in its entirety.

BACKGROUND

Processes for removing noise from data or a signal are generally referred to as denoising, and a number of denoising processes have been developed The goal of most denoising processes is to convert a noisy signal $S_N$ into a recovered signal $S_R$ that is "closer" to an input or clean signal $S_C$. Since the clean signal $S_C$ is unavailable during denoising, a denoising process may use a priori knowledge of characteristics of the clean signal $S_C$ when attempting to identify and remove noise. Alternatively, universal denoising processes in general operate with little or no a priori knowledge of the characteristics of the clean signal $S_C$ but may instead rely on knowledge or measurements of the source of the noise.

Discrete Universal DEnoising, sometimes referred to herein as DUDE, is a type of universal denoising that can be applied to a noisy signal $S_N$ containing discrete symbols $s_i$ from a known alphabet $A=\{\alpha_1, \alpha_2, \ldots \alpha_n\}$. DUDE uses a context $\eta(s)$ of each symbol s being denoised, where the context $\eta(s)$ in general is set of symbols that in some sense neighbor the symbol s. For example, in a signal composed of a series of symbols representing digitized amplitudes of audio or another continuous signal, a context $\eta(s)$ of a symbol s may include one or more symbols preceding and/or following symbol s in a time ordering of noisy signal $S_N$. In an image composed of symbols that are pixel values, each symbol s corresponding to a pixel away from the edge of the image may have a context $\eta(s)$ defined to be the pixel values for pixels within a 2-dimensional area in the image.

DUDE generally includes a modeling scan and a replacement scan of the noisy signal $S_N$. The modeling scan determines count vectors $m(\eta)$ for respective contexts $\eta$. Each component $m(\eta)_{[i]}$ of a count vector $m(\eta)$ indicates the number of times a corresponding symbol $\alpha_i$ is found in context $\eta$ in the noisy signal $S_N$. Related count vectors $q(\eta)$ containing counts of symbols in the clean signal $S_C$ that end up having context $\eta$ in the noisy signal $S_N$ indicate the input distribution of the clean signal $S_C$. Lacking the clean signal $S_C$, DUDE cannot directly determine the count vectors $q(\eta)$ but can estimate count vectors $q(\eta)$ using available information from the noisy signal $S_N$ and assumptions concerning or knowledge of the source of targeted noise. In particular, the source of the targeted noise can be modeled as a channel that is represented by a channel matrix $\Pi$, and one technique for estimating the input distribution is through vector multiplication of measured count vector $m(\eta)$ by the inverse of channel matrix $\Pi$, e.g., $q^T(\eta) \approx m^T(\eta)\Pi^{-1}$. (As a convention for matrix expressions herein, vectors such as $q(\eta)$ and $m(\eta)$ are assumed to be column vectors, and transposed vectors such as $q^T(\eta)$ and $m^T(\eta)$ are assumed to be row vectors.)

The replacement scan generates recovered signal $S_R$ by replacing each occurrence of a symbol $\alpha_i$ found in context $\eta$ in the noisy signal $S_N$ with a symbol $\alpha_j$ that minimizes an estimated distortion resulting from such replacement of symbol $\alpha_i$ with symbol $\alpha_j$ relative to the clean signal $S_C$. (Symbols $\alpha_i$ and $\alpha_j$ may be equal, which is equivalent to the replacement scan leaving $\alpha_i$ unchanged when found in context $\eta$.) Equation 1 indicates a distortion $D(\alpha_i,\alpha_j,\eta)$ suitable for the DUDE process and an estimation of the distortion using estimated count vector $m^T(\eta)\Pi^{-1}$ in place of count vector $q^T(\eta)$. In Equation 1, vector $\lambda(\alpha_j)$ is a column of a symbol transformation matrix $\Lambda$, and each component of vector $\lambda(\alpha_j)$ indicates a measure of the distortion created in clean signal $S_C$ by replacing the symbol corresponding to that component with symbol $\alpha_j$. Vector $\pi(\alpha_i)$ is a column of channel matrix $\Pi$ and has components indicating the probability of the channel (i.e., the source of targeted noise) replacing a corresponding symbol with symbol $\alpha_i$, and the Schur product $\lambda(\alpha_j) \odot \pi(\alpha_i)$ generates a vector having components equal to the products of corresponding components of vectors $\lambda(\alpha_j)$ and $\pi(\alpha_i)$.

$$D(\alpha_i,\alpha_j,\eta) = q^T(\eta)(\lambda(\alpha_j) \odot \pi(\alpha_i)) \approx m^T(\eta)\Pi^{-1}(\lambda(\alpha_j) \odot \pi(\alpha_i)) \qquad \text{Equation 1}$$

A paper by Tsachy Weissman, Erik Ordentlich, Gadiel Seroussi, Sergio Verdú, and Marcelo J. Weinberger, entitled "Universal Discrete Denoising: Known Channel," IEEE Transactions On Information Theory, Vol. 51, No. 1, January 2005 provides further description of the DUDE process and is hereby incorporated by reference in its entirety.

Denoising using DUDE and an estimated distortion $m^T(\eta)\Pi^{-1}(\lambda(\alpha_j) \odot \pi(\alpha_i))$ will provide best performance if the quantity $m^T(\eta)\Pi^{-1}$ provides an accurate estimate of the count vectors $q^T(\eta)$. However, for some types of noisy channels, e.g., channels producing additive Gaussian noise, channel matrices $\Pi$ can be near singular so that numerical determination of the inverse matrix $\Pi^{-1}$, e.g., using computers, results in significant errors. Additionally, the measured count vectors $m(\eta)$ are subject to statistical variations that can be magnified when multiplied by inverse matrix $\Pi^{-1}$ whether inverse matrix $\Pi^{-1}$ is accurate or not. Accordingly, other methods for estimating the input distribution are needed when denoising signals that were subjected to some sources of noise.

SUMMARY

In accordance with an aspect of the invention, a denoising process uses convex optimization to determine characteristics of a clean signal. In one particular embodiment, the process scans a noisy signal that represents a set of symbols to determine a first vector with components respectively indicating probabilities of finding that respective symbols in the noisy signal have a first context. A convex optimization process can then identify a second vector such that a difference between the first vector and a product of the second vector and a channel matrix is minimized. In general, the channel matrix is such that a result of applying of the channel matrix to symbols represented in a clean signal is statistically equal to the set of symbols represented by the noisy signal. Using the second vector, a reconstructed signal can be assembled by replacing occurrences a first of the symbols when found with the first context with a second symbol that minimizes a distortion determined using the second vector to approximate characteristics of the clean signal.

BRIEF DESCRIPTION OF THE DRAWINGS

Use of the same reference symbols in different figures indicates similar or identical items.

DETAILED DESCRIPTION

In accordance with an aspect of the invention, a denoiser or a denoising process can estimate an input distribution of a clean signal $S_C$ even when a channel matrix $\Pi$ that models the noise to be removed is singular or nearly singular. Such denoisers may be implemented in software or firmware that is stored on a computer readable media and executed by a general purpose computer, may be implemented using application specific hardware, or may be implemented using a combination of software and hardware.

Figure 1:
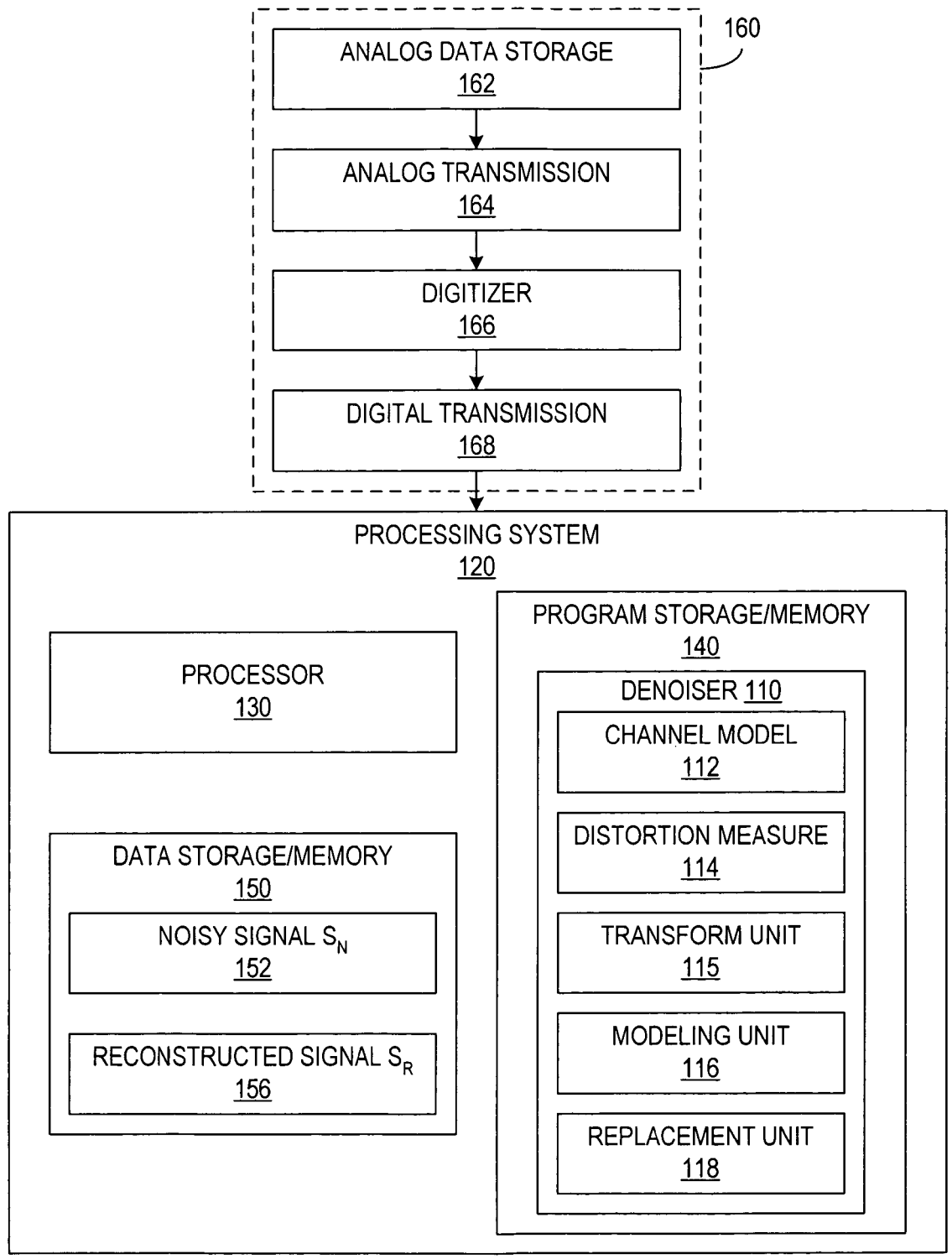
FIG. 1 is a block diagram of a denoising system in accordance with an embodiment of the invention.

FIG. 1 illustrates a system 100 in accordance with an embodiment of the invention in which a denoiser 110 is implemented in software or firmware executed by a processor 130 in a processing system 120. Processing system 120 can be a general purpose computer having memory and data storage that may be implemented using conventional components such as DRAM, SRAM, Flash memory, or other IC memory, disk storage such as hard drives, CD-ROM, or DVD ROM, or any other medium capable of storing computer readable instructions. The memory/storage of processing system 120 in FIG. 1 is divided into program storage/memory 140 containing programs or routines implementing denoiser 110 and data storage/memory 150 containing noisy data 152 (i.e., a noisy signal $S_N$) and denoised data 152 (i.e., a reconstructed signal $S_R$).

Processing system 120 receives noisy data 152 from an input system 160, which may include one or more sources of noise. In the illustrated embodiment, system 160 includes analog data storage 162, an analog transmission channel 164, a digitizer 166, and a digital transmission channel 168. Each of these is an example of a potential source for noise. For example, analog data storage 162 may be paper, celluloid film, or a magnetic medium that stores an analog version of the data and is subject to wear or other deterioration that creates noise. Analog and digital transmission channels 164 and 165 are also subject to transmission errors that can cause noise in noisy data 152. Digitizer 166, which converts the data from analog form to digital form, may be yet another source of the noise. It should be noted that analog data storage 162, analog transmission channel 164, digitizer 166, and digital transmission channel 168 are illustrated here merely as examples of potential sources of noise. All sources of noise targeted for removal by denoiser 110 are collectively referred to herein as the noisy channel.

The noise that denoiser 110 removes from noisy signal $S_N$ depends on a channel model 112 that denoiser 110 uses for the noisy channel. Denoiser 110 can, for example, select channel model 112 for removal of one or more particular types of noise such as impulse noise or Gaussian noise. In such cases, a "clean" signal $S_C$ may be thought of as containing noise that is either acceptable or not currently targeted for removal. For general noise removal, denoiser 110 can select channel model 112 according to a priori knowledge of the sources of the noise or can include in channel model 112 parameters that are adjustable to adapt to user preferences or according to measurements characterizing the noisy channel.

In the exemplary embodiment, channel model 112 is based on a channel matrix $\Pi$ having columns $\pi(\alpha_i)$ corresponding to respective symbols $\alpha_i$ in the alphabet of clean signal $S_C$. Each column $\pi(\alpha_i)$ contains one component for each symbol in the alphabet for noisy signal $S_N$, and each component in each column $\pi(\alpha_i)$ indicates the probability that the noisy channel will replace a symbol corresponding to that component with the symbol $\alpha_i$. This type of channel model corresponds to the noise that only depends on a single symbol in clean symbol $S_C$ and not on the values of a group of symbols. Such channel models can be developed by observing the effect of the noisy channel on a known clean signal.

Denoiser 110 implements a DUDE process to generate recovered signal $S_R$ from noisy signal $S_N$. For the DUDE, denoiser 110 has a modeling unit 116 that scans noisy signal $S_N$ and constructs a data structure indicating empirical count vectors $m(\eta)$. As noted above, each component $m(\eta)_{[i]}$ of a count vector $m(\eta)$ indicates the number of times a corresponding symbol $\alpha_i$ is found with a context $\eta$ in the noisy signal $S_N$. A replacement unit 118 in denoiser 110 uses count vectors $m(\eta)$, channel model 112, and a distortion measure 114 to estimate the distortion created relative to clean signal $S_C$ when a symbol $s_i$ having context $\eta$ is replaced by a symbol $s_j$ and selects a replacement signal $\alpha_R$ that minimizes the estimated distortion.

Equation 1 above indicates the estimated distortion in terms of count vectors $q(\eta)$, a column $\pi(\alpha_i)$ of the channel matrix $\Pi$, and a column $\lambda(\alpha_j)$ of a symbol transformation matrix $\Lambda$. Channel model 112 and distortion measure 114 respectively define channel matrix $\Pi$ and symbol transformation matrix $\Lambda$. However, denoiser 110 may be unable to accurately estimate a count vector $q(\eta)$ by multiplying an empirical count vector $m(\eta)$ by the inverse channel matrix $\Pi^{-1}$ when channel matrix $\Pi$ is nearly singular. A transform unit 115, which may be part of modeling unit 116 or replacement unit 118, executes a process that determines an estimate of an input distribution or count vectors $q(\eta)$ from the available empirical count vectors $m(\eta)$. In accordance with aspects of the current invention, transform unit 115 can use several alternative processes to estimate an input distribution of a clean signal $S_C$ even when the channel matrix $\Pi$ that models the noise to be removed is nearly singular.

With one embodiment of the invention, which is described below in a section entitled "Inversion of Near-Singular Channel Models," input distributions are estimated through transformation of the empirically determined distributions or count vectors using a pseudo inverse of the channel matrix. Another embodiment of the invention, which is described below in a section entitled "Input Distribution Determination Using Iterative Projection," effectively projects an empirical count vector on to the space of the count vectors for clean signal. A section entitled "Correction of Estimated Count or Probability Vectors" describes a process for correcting an estimated count or probability vector to remove negative components that may appear is some estimation processes as a result of statistical variations. In yet another embodiment of the invention, which is describe below in a final section entitled "Input Distribution Estimation Using Convex Optimization," the determination of the input distribution uses convex optimization to avoid matrix multiplication by a numerically determined inverse of a near-singular channel matrix.

Inversion of Near-Singular Channel Models

Equation 1 above indicates a distortion $D(\alpha_i,\alpha_j,\eta)$ suitable for DUDE and suggests approximating a count vector $q(\eta)$ (or a transposed count vector $q^T(\eta)$) in the determination of distortion $D(\alpha_i,\alpha_j,\eta)$ by matrix product of a corresponding empirical count vector $m(\eta)$ and the inverse channel matrix $\Pi^{-1}$. However, the channel matrix $\Pi$ can be singular or near singular, and statistical fluctuations in the experimentally determined count vector $m(\eta)$ can cause the product $m^T(\eta)\Pi^{-1}$ to differ significantly from the desired count vector $q^T(\eta)$. This section describes how DUDE can be adapted to estimate a count vector $q(\eta)$ using a pseudo inverse in place of inverse channel matrix $\Pi^{-1}$ when a singular value decomposition of the channel matrix $\Pi$ has a low condition number, i.e., a relatively low value for the ratio of the maximum and minimum singular values found in the singular value decomposition.

In an exemplary embodiment of this process, a pseudo inverse Pinv($\Pi'$) can be computed via a singular value decomposition of the channel matrix $\Pi$ followed by elimination of the smallest singular values. As described further below, matrix $\Pi'$ is a singular matrix that is obtained from channel matrix $\Pi$ by insertion of 0 in place of small-magnitude entries in a diagonal matrix found through a singular value decomposition of channel matrix $\Pi$. Under specific conditions, pseudo inverse matrix Pinv($\Pi'$) is similar to inverse channel matrix $\Pi^{-1}$ but avoids amplification of statistical fluctuations in the count vectors, and use of the pseudo inverse matrix Pinv($\Pi'$) in place of inverse matrix $\Pi^{-1}$ improves denoising performance by improving the estimate of the input distribution. However, if the condition number of the channel matrix $\Pi$ is too high, determination of a pseudo inverse Pinv($\Pi'$) may discard too many of the diagonal values, and other estimation techniques described in the following sections may provide better denoising performance.

Figure 2:
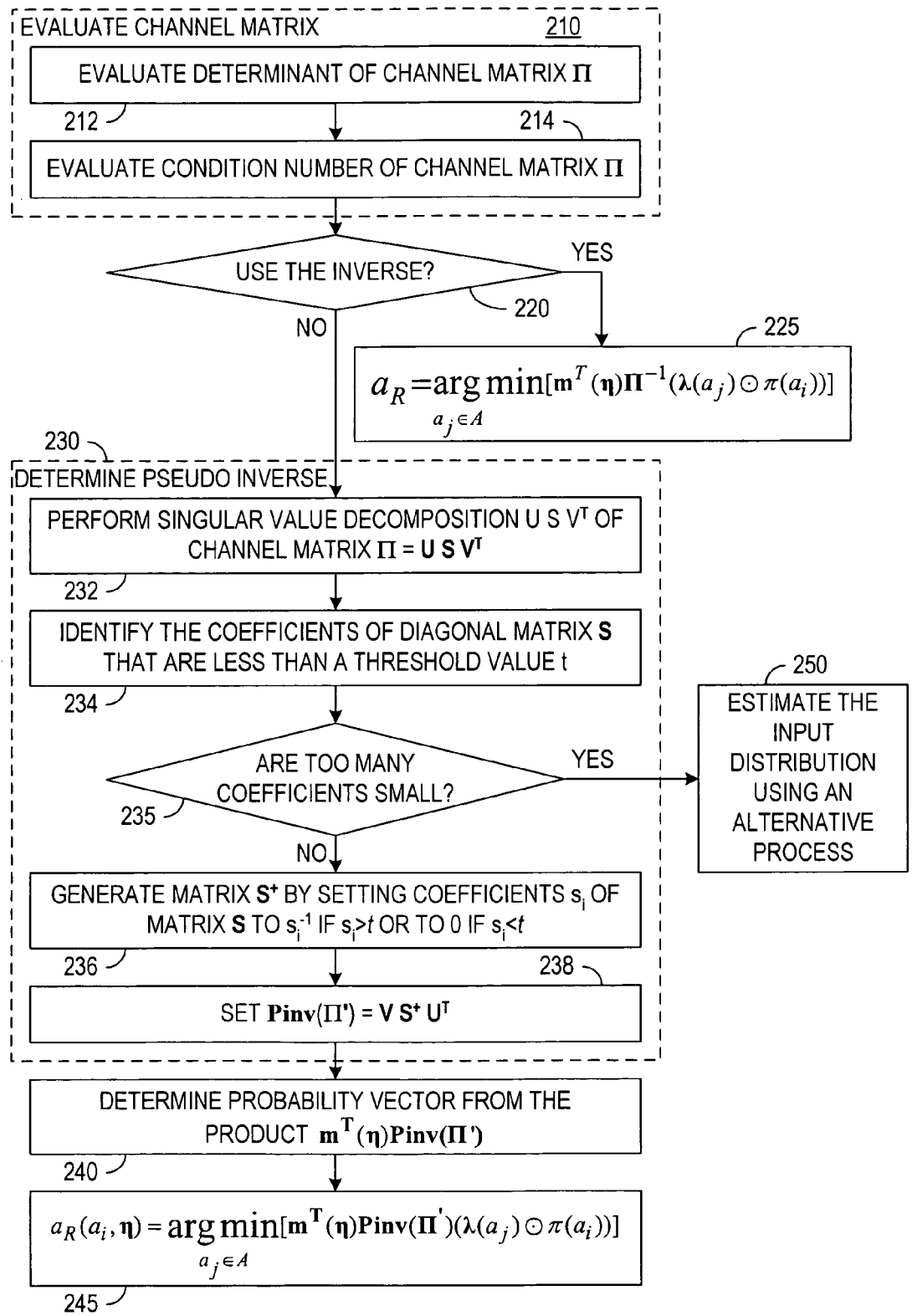
FIG. 2 is a flow diagram of a process for generating denoised data in accordance with an embodiment of the invention employing a pseudo inverse.

FIG. 2 is a flow diagram of a process 200 for determining a denoised value. Process 200 begins with an evaluation 210 of channel matrix $\Pi$ to determine whether the inverse channel matrix $\Pi^{-1}$ is suitable for numeric determination of denoised values. In an exemplary embodiment, the evaluation of channel matrix $\Pi$ includes a step 212 of determining a determinant det($\Pi$) of the channel matrix $\Pi$ and a step 214 of determining the condition number for channel matrix $\Pi$. A decision step 220 then decides whether to use the inverse matrix $\Pi^{-1}$ in generating denoised data. If inverse channel matrix $\Pi^{-1}$ is used, step 225 determines a symbol $\alpha_R$ that replaces symbol $\alpha_i$ as in context $\eta$ using Equation 2. In Equation 2, count vector $m^T(\eta)$ is the empirical count vector of symbols having context $\eta$ within noisy signal $S_N$ or can be generated from other data structures such as class count vectors, which are described in U.S. patent application Ser. No. 11/180,066. Matrix $\Pi^{-1}$ is the inverse of the channel matrix, and vector $\lambda(\alpha_j) \odot \pi(\alpha_i)$ is the Schur product of columns of the distortion and channel matrices $\Lambda$ and $\Pi$ respectively corresponding to symbols $\alpha_j$ and $\alpha_i$. Replacement symbol $\alpha_R$ is a symbol $\alpha_j$ from alphabet A that provides a minimum of estimated distortion.

Equation 2: $a_R(a_i, \eta) = \underset{a_j \in A}{\operatorname{argmin}}[m^T(\eta)\Pi^{-1}(\lambda(a_j) \odot \pi(a_i))]$ If the inverse channel matrix $\Pi^{-1}$ is not being used, step 230 determines whether a pseudo inverse matrix Pinv($\Pi'$) of the channel matrix is suitable. In the illustrated embodiment of the invention, the pseudo inverse matrix Pinv($\Pi'$) is the Moore-Penrose inverse, but more generally, other generalized matrix inverses could be used. The Moore-Penrose inverse can be found as illustrated in steps 232, 234, 235, 236, and 238 of FIG. 2. When determining the pseudo inverse, step 232 performs a singular value decomposition (SVD) of the channel matrix $\Pi$ as indicated in Equation 3. In Equation 3, each of matrices U and V is an orthogonal matrix. Matrix S in Equation 3 is a non-negative diagonal matrix.

$\Pi = U \cdot S \cdot V^T$  Equation 3

Step 234 determines the number of diagonal coefficients of matrix S that are less than a threshold t. In an exemplary embodiment, Equation 4 gives the threshold t in terms of the largest coefficient $s_0$ of matrix S and the smallest dimension m or n of the channel matrix $\Pi$. In general, the channel matrix will be square (n=m) when the alphabets for the clean and noisy signals are the same. The small coefficients of matrix S can be sources of instability in numerical evaluations of inverse $\Pi^{-1}$ and can be ignored in the pseudo inverse Pinv($\Pi'$) as described further below. However, if too many of the diagonal coefficients of diagonal matrix S are ignored, the product $m^T(\eta)$ Pinv($\Pi'$) will fail to properly characterize the statistical properties of the clean data, and a decision step 235 determines that an alternative estimation process 250 should be used as described further below.

$t = 0.0001 \min(m,n)s_0$  Equation 4

Pseudo inverse Pinv($\Pi'$) is preferably used if the channel matrix $\Pi$ has a determinant that is less than about 0.001 and a condition number that is less than about 50 for an alphabet containing 256 symbols. In which case, determination 230 of pseudo inverse Pinv($\Pi'$) continues with the step 236 of generating a diagonal matrix $S^+$ that is found by replacing each coefficient $s_i$ that is greater than or equal to threshold t in diagonal matrix S with multiplicative inverse $s_i^{-1}$ and replacing coefficient $s_i$ that is less than threshold t in diagonal matrix S with 0. Step 238 sets pseudo inverse Pinv($\Pi'$) equal to $VS^+U^T$. In a manner similar to that described above for the DUDE, a probability vector $q^T(\eta)$ can be estimated from the product $m^T(\eta)$Pinv($\Pi'$) in step 240, and the denoised symbol $\alpha_R$ can then be determined in step 245 using Equation 5. As noted further below, if vector $m^T(\eta)$ is normalized to be a probability vector, the product $m^T(\eta)$Pinv($\Pi'$) may be a probability vector or may require adjustment (e.g., removal of negative coefficients) to create a probability vector.

Equation 5: $a_R(a_i, \eta) = \underset{a_j \in A}{\operatorname{argmin}}[m^T(\eta)Pinv(\Pi')(\lambda(a_j) \odot \pi(a_i))]$ Channel matrix $\Pi$ in some cases is such that neither inverse $\Pi^{-1}$ nor pseudo inverse Pinv($\Pi'$) provides an accurate numeric projection of empirical count vectors $m(\eta)$ from the noisy signal $S_N$ back to the space of the clean signal $S_C$. In these cases, estimation process 250 can use one of the techniques described below to estimate the probability vectors $q(\eta)$.

Input Distribution Determination Using Iterative Projection

Figure 3:
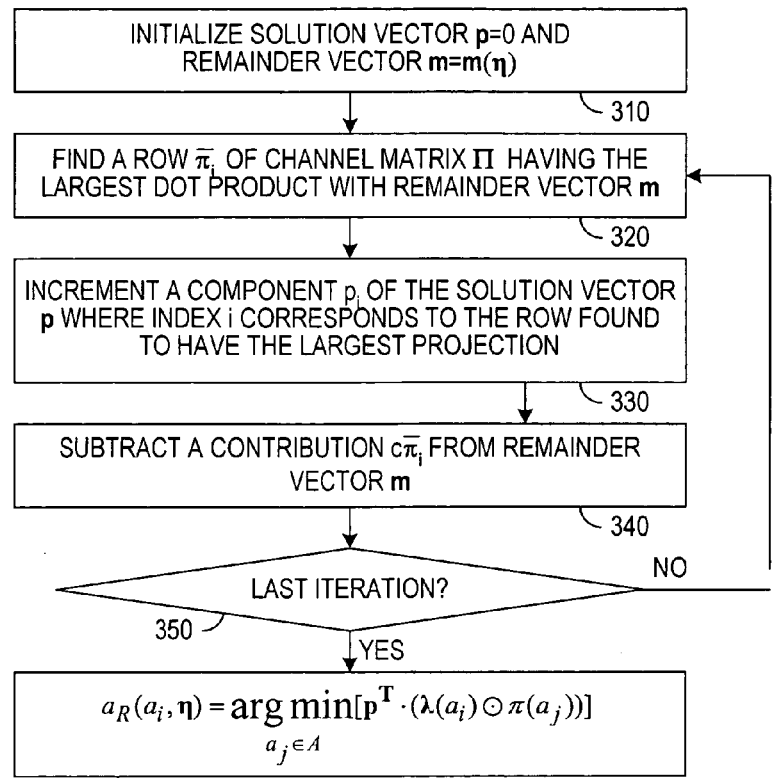
FIG. 3 is a flow diagram of a process in accordance with an embodiment of the invention that estimates an input probability vector without determining an inverse or a pseudo inverse of a channel matrix.

FIG. 3 illustrates an exemplary embodiment of an estimation process 300 for a count or probability vector $q(\eta)$ that upon transmission through the noisy channel results in a count or probability vector $m(\eta)$. (The term probability vector as used herein refers to a vector with positive components that sum to 1, and in general, count vector $m(\eta)$ or $q(\eta)$ can be renormalized to create a probability vector, i.e., by dividing by each component by the sum of the components of the vector.) Estimation process 300 uses an iterative process to construct an expansion of probability vector $m(\eta)$ in terms of the rows of channel matrix $\Pi$. Step 310 begins process 300 by setting a solution vector p to an initial value (e.g., to zero) and setting a remainder vector m equal to probability vector $m(\eta)$. Step 320 then finds the row $\overline{\pi}_i$ of channel matrix $\Pi$ having the largest dot product with remainder vector m, i.e., the row have the largest projection on remainder vector m. The component $p_i$ of solution vector p corresponding to the identified row $\overline{\pi}_i$ of channel matrix $\Pi$ is then incremented in step 330 using the formula of Equation 6. In Equations 6 and 7, $\|\overline{\pi}_i\|$ is the squared norm or magnitude of row vector $\overline{\pi}_i$, and $\beta$ is a constant less than one, for example, about equal to 0.1. In general, constant $\beta$ is selected so that the solution vector p does not converge prematurely. Step 340 then subtracts from remainder vector m a contribution as indicated in Equation 7 to account for the addition to solution vector p.

Equation 6: $p_i \rightarrow p_i + \beta \dfrac{m \cdot \overline{\pi}_i}{\|\overline{\pi}_i\|}$ Equation 7: $m \rightarrow m - \beta \dfrac{m \cdot \overline{\pi}_i}{\|\overline{\pi}_i\|} \overline{\pi}_i$ Steps 320, 330, and 340 are repeated until a decision step 350 determines that the iterations are finished. The iterations may be deemed finished when, for example, the sum of the components of solution vector p is nearly 1, a predetermined maximum number of iterations have been executed, or the energy remaining in remainder vector m is below a predetermined threshold. At this point, solution vector p can be renormalized to have a magnitude of 1 and/or checked and corrected for negative components as described further below. For determination of replacement values $\alpha_R$, the final solution vector p for an empirical count vector $m(\eta)$ can be used as an estimate for count vector $q(\eta)$ as shown in step 360 and Equation 8.

Equation 8: $\underset{a_j \in A}{\mathrm{argmin}}[p^T \cdot (\lambda(a_i) \odot \pi(a_j))]$

Correction of Estimated Probability Vectors

The empirical nature of count vectors $m(\eta)$ can sometimes lead to an estimated probability vector $q^T(\eta)$, e.g., $m^T(\eta)\Pi^{-1}$, $m^T(\eta)\mathrm{Pinv}(\Pi')$, or an iterated solution p, having one or more negative components. When this occurs, a correction process can project the estimated probability vector p to a vector q having only non-negative components.

Figure 4:
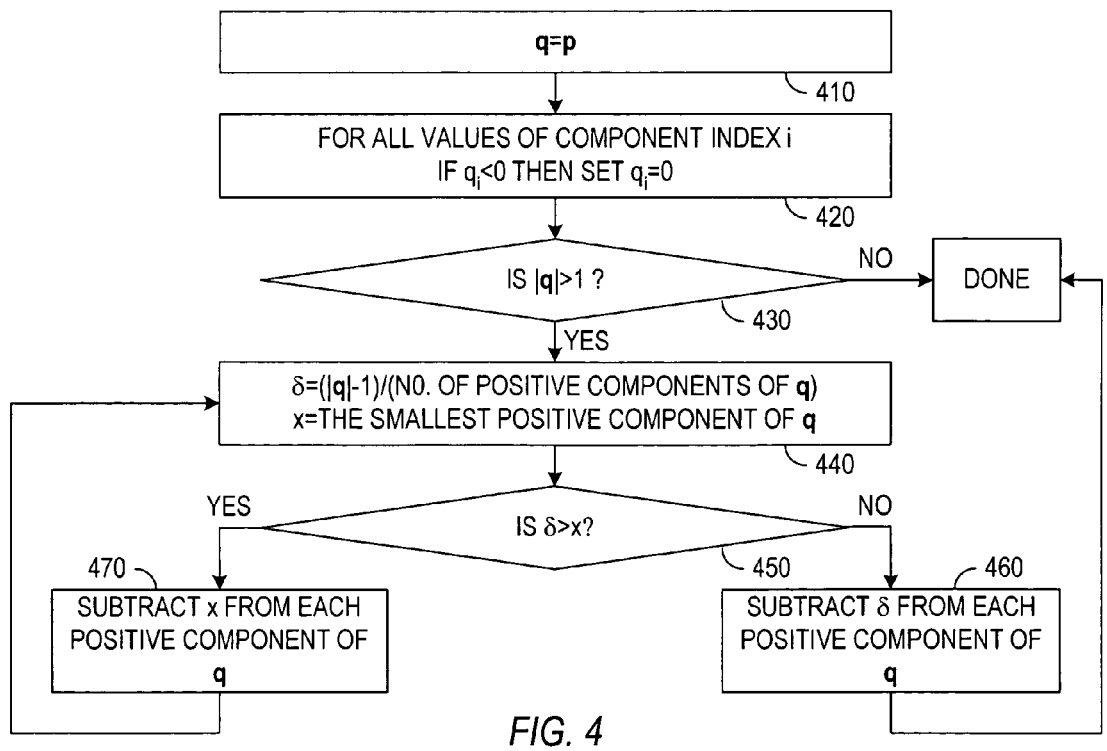
FIG. 4 is a flow diagram of a process for producing a probability vector from a vector of errors or statistical variations.

FIG. 4 illustrates an exemplary process 400 for producing a non-negative vector q from a vector p that may have negative components. Process 400 begins with a step 410 of setting vector q equal to the vector p. At this point, vector q may have negative components. Step 420 sets all of the negative components of q to zero. Eliminating the negative components may cause the sum of the component probabilities in vector q to be greater than 1.

Decision step 430 checks to see whether the sum of the components of vector q is greater than 1. If not, process 400 is done and vector q has only non-negative components that sum to 1, as generally required for a probability vector. If the sum of the components of vector q is greater than 1, process 400 branches from step 430 to step 440. Step 440 identifies the smallest positive component x of vector q and determines a per-component difference $\delta$, which is a ratio of the difference between the sum of the components of vector q and 1 and the number of positive components.

Step 450 then determines whether the per-component difference $\delta$ is greater than the smallest positive component x. If not, step 460 subtracts per-component difference $\delta$ from each positive component, leaving vector q with components that sum up to 1 as required of a probability vector. Otherwise, step 470 subtracts the smallest positive component from each of the positive components and then branches back to step 440. Each execution of step 470 sets the prior smallest positive component to zero and decreases the sum of the components of vector q by less than the previous difference from 1. After a sufficient number of repetitions, the per-component difference $\delta$ will be smaller than the smallest component, and process 400 will execute step 460 and end.

Input Distribution Determination Using Convex Optimization

In accordance with yet another embodiment of the invention, the process of determining the input distribution from empirical analysis of a noisy signal $S_N$ can employ convex optimization techniques. In particular, if a channel matrix $\Pi$ correctly models the noise to be removed, a clean signal $S_C$ is most likely to have an input distribution and a probability vector $q(\eta)$ such that the product $q^T(\eta)\Pi$ is equal to (or because of statistical variations nearly equal to) the measured probability vector $m^T(\eta)$. With this in mind, a function $f_1(p)$ can be defined to be the magnitude (or L2 norm $\|\;\|_2$) of the difference between the empirical probability vector $m^T(\eta)$ and product of a channel matrix $\Pi$ and a vector $p^T$ as shown in Equation 9. Function $f_1(p)$ is strictly positive because the magnitude (i.e., the L2 norm) of a vector is positive and has a minimum value when vector p is equal to (or nearly equal to) probability vector $q(\eta)$. The process of finding the input distribution can thus be converted to a process for finding a unique (or the correct) probability vector p* that minimizes the function $f_1(p)$.

$f_1(p) = \|p^T \Pi - m^T(\eta)\|_2$    Equation 9

Squaring function $f_1(p)$ produces a function $f_2(p)$ as shown in Equation 10 that is also strictly positive and has a minimum at or near vector $q(\eta)$. Additionally, function $f_2(p)$ is a quadratic function of vector p and therefore can be shown to be convex since matrix product $\Pi\Pi^T$ is positive semidefinite, that is all of its Eigen values are non-negative (some could be 0). As indicated above, to find input probability vector $q(\eta)$, an optimization process needs to find the vector p* that both minimizes function $f_2(P)$ and is a probability vector. Accordingly, the components of vector p* minimize the function $f_2(p)$ subject to the constraints that the components of vector p are positive and sum to 1. These constraints on the optimization process are expressed in Equations 11. In Equations 11, $p_{[\alpha]}$ is the component of probability vector p corresponding to symbol α, and set A is the alphabet of clean signal $S_C$. It can be shown that the constraints of Equations 10 are convex. See, for example, S. Boyd and L. Vandenberghe, "Convex Optimization," Cambridge Press, (2004). Quadradic programming can thus be used to minimize $f_2(p)$ of Equation 10 under the conditions of Equations 11. Since the function $f_2(p)$ and the constraints are convex, known convex optimization process can be applied to solve for the vector p* approximates input vector q(η).

Equation 10: $f_2(p) = \|p^T\Pi - m^T(\eta)\|_2^2$
$= p^T\Pi\Pi^T p - 2p^T\Pi m(\eta) + m^T(\eta)m(\eta)$ Equation 11: $p_{[a]} \in [0, 1]$ for all $a \in A$ and $\sum_{a \in A} p_{[a]} = 1$ The optimization problem set forth above can be recast to eliminate the equality constraint of Equations 11, i.e., eliminate $$\sum_{a \in A} p_{[a]} = 1$$

as a constraint. This can simplify use of some standard convex optimization techniques such as the log-barrier technique. To recast the optimization problem, a vector $\hat{p}$ can be defined to be equal to vector p after removal of one component. Vector $\hat{p}$ will thus have N−1 components if N is the number symbols in the alphabet A and the number of components in vector p. To provide a concrete example, the following assumes removal of the component $p_{[\alpha_0]}$ that corresponds to a symbol $\alpha_0$ and is the last component in vector p. A basis vector $e_0$ is defined to be an N-component vector with a component corresponding to symbol $\alpha_0$ equal to 1 and all other components equal to zero, and a matrix X can be defined to have N−1 rows and N columns where first (N−1) columns of matrix X form an (N−1)×(N−1) identity matrix and all components in the Nth column of matrix X are equal to −1 as shown in Equation 12. With these definitions, the condition that the components of probability vector p sum up to 1 implies that $p=X^T\hat{p}+e_0$. The function $f_2(p)$ can be rewritten as a function $f(\hat{p})$ shown in Equation 13, where C is a constant that depends on the empirical probability vector m(η). To simplify the expression, dependence of empirical probability vector m on context η is not shown in Equation 13.

Equation 12: $X = \begin{pmatrix} 1 & 0 & \cdots & 0 & -1 \\ 0 & 1 & \ddots & 0 & -1 \\ \vdots & \ddots & \ddots & \vdots & -1 \\ 0 & 0 & \cdots & 1 & -1 \end{pmatrix}$ Equation 13: $f(\hat{p}) = \|(X^T\hat{p} + e_0)^T\Pi - m^T\|_2^2$
$= \hat{p}^T X\Pi\Pi^T X^T \hat{p} + 2\hat{p}^T X\Pi\Pi^T e_0 - 2\hat{p}^T X\Pi m + C$ The equality constraint in Equations 11 can thus be used to remove one of the components of vector p from the arguments of the function $f(\hat{p})$ of Equation 13. The requirement that vector p be a probability vector leads to the constraints of Equations 14 on the components of vector $\hat{p}$. Since the constraints of Equations 14 are all inequalities, a simple log-barrier technique of convex optimization can be used to approximate a vector $\hat{p}^*$ corresponding to the minimum of function $f(\hat{p})$. The minimizing vector $\hat{p}^*$ indicates the input distribution required for the DUDE process. In particular, the desired probability vector q(η) can then be approximated by $X^T\hat{p}^*+e_0$. This solution is optimal, with respect to the $L_2$ norm, within the simplex. Simplification of the constraints would not be an issue if there was no empirical noise, but with the addition of empirical noise, some of the constraints of Equations 14 may be active, e.g., some of the components of vector $\hat{p}^*$ may be 0.

Equations 14: $\hat{p}_{[a]} \in [0, 1]$ for $a \in A \setminus a_0$ and $\sum_{a \in A \setminus a_0} \hat{p}_{[a]} \in [0, 1]$ The above techniques have reduced the determination of a transformation with an inverse channel matrix to a convex optimization process that can use known numeric or mathematical techniques such as the log-barrier method of convex optimization. However, if the channel matrix is singular, function $f(\hat{p})$ may not have a unique minimum, which can affect the convex optimization process. In particular, when the optimization process looks for a direction of decent, the objective function will be invariant to a subspace that is the null space of the channel matrix Π. Accordingly, when the channel matrix Π is singular, the convex optimization process can find a solution, but the solution found is not necessarily near the true input distribution. A channel matrix that is nearly singular, e.g., a channel matrix corresponding to additive Gaussian noise, will not have a true null space other than the trivial one but for numerical purposes may have a null space that leads to solutions that are not unique and therefore may differ significantly from the true input distribution. In general, the closeness of the numerical optimization to the true distribution may be suggested by indicators like the condition number but may additionally depend on the noisiness of the statistics, which in turn depends on the noise level and the number of counts for empirical vectors m(η).

The optimization process should be configured to make convergence less susceptible to numerical error. For example, a convex optimization process can use a gradient descent or a Newton step approach. The gradient descent approach can be geometrically envisioned as locally approximating the objective function with a hyper plane while the Newton step uses quadratics to locally approximate the objective function. Generally, the Newton step has faster convergence and is often preferred. However it is likely that in calculating the needed quadratic fit, the Newton step method is more susceptible to numerical errors resulting from the near singularity of the channel matrix. This results from the need to calculate the inverse of the Hessian of the objective function. This gives reason to favor the gradient descent method. Unfortunately, the gradient descent method is much slower to converge and may be impractical in systems with limited processing speed.

Figure 5:
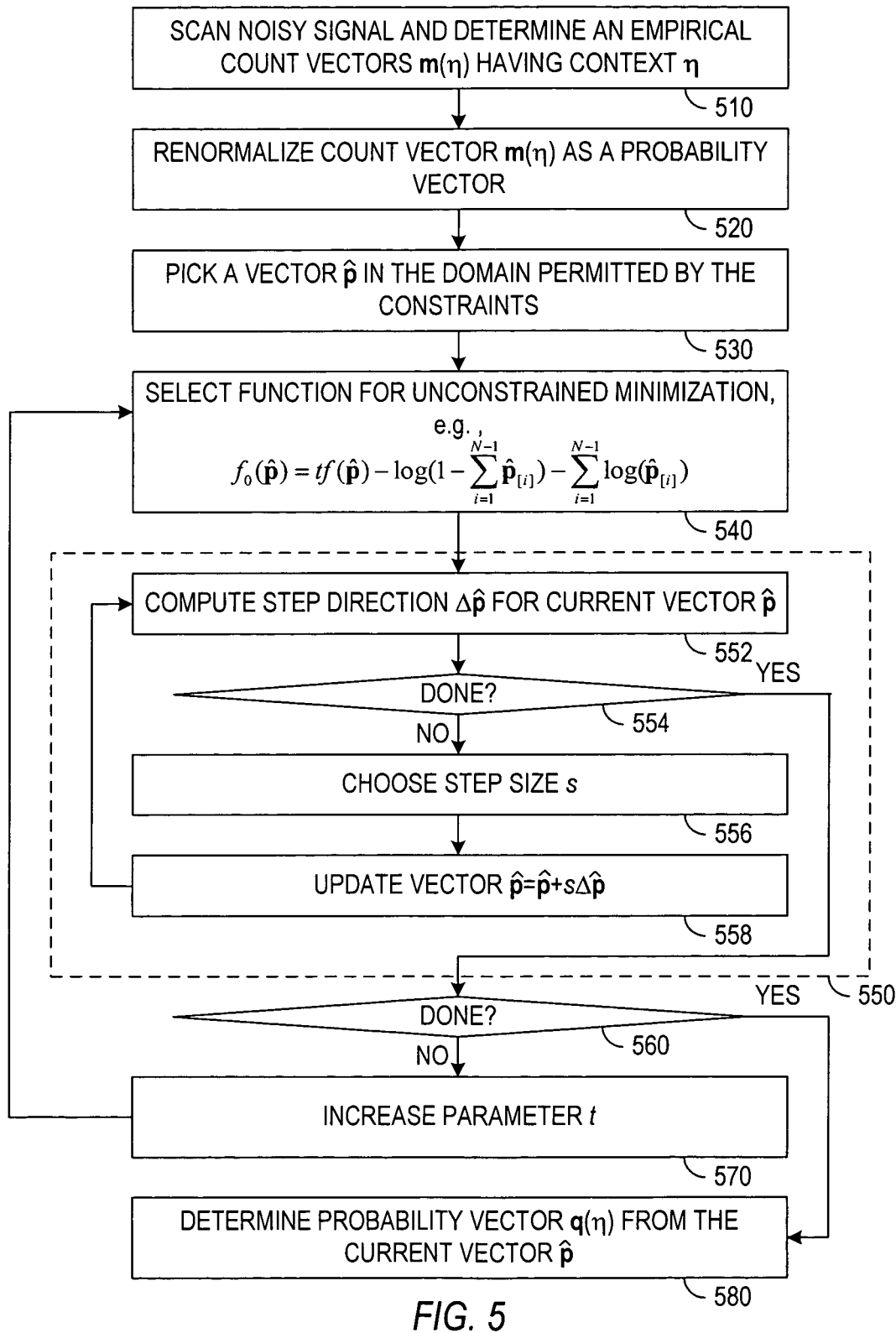
FIG. 5 is a flow diagram of a process in accordance with an embodiment of the invention that uses convex optimization and Newton step techniques to estimate an input distribution.

FIG. 5 is a flow diagram of a process 500 using convex optimization to determine an input distribution for an unknown clean signal $S_C$ given a noisy signal $S_N$ and a channel matrix Π that models the targeted noise. Process 500 begins with a step 510 of scanning the noisy signal $S_N$ and determining an empirical count vector m(η) associated with a context η. The empirical count vector m(η) is renormalized as a probability vector in step 520 to simplify further processing. Step 530 then selects a candidate vector $\hat{p}$ that has N−1 components and is within the domain permitted by the constraints, e.g., Equations 14. The initial candidate vector $\hat{p}$ may, for example, be selected based on or be derived from empirical probability vector m(η). In particular, empirical probability vector m(η) after removal of a component may be a suitable initial candidate vector p̂.

Process 500 then uses a barrier technique for optimization under constraints. In particular, step 540 selects a function $f_0(\hat{p})$ that includes barrier terms that become singular when vector p̂ reaches the boundary of the domain defined by the constraints. Equation 15 indicates a suitable function $f_0(\hat{p})$ in which the barrier terms are logarithms that become singular as their arguments approach 0, i.e., when any component $\hat{p}_{[i]}$ approaches zero or the sum of components $\hat{p}_{[i]}$ approaches 1. In Equation 15, function $f(\hat{p})$ is the function for which a minimum is being sought, e.g., function $f(\hat{p})$ of Equation 13, and t is a parameter of the optimization process that determines the weighting of the function $f(\hat{p})$ relative to the barrier terms corresponding to the constraints. The initial value of parameter t is not critical, but in an illustrative process, parameter t may initially be set to 1.

$$\text{Equation 15:} \quad f_0(\hat{p}) = tf(\hat{p}) - \log\left(1 - \sum_{i=1}^{N-1} \hat{p}_{[i]}\right) - \sum_{i=1}^{N-1} \log(\hat{p}_{[i]})$$

A sub-process 550 changes vector p̂ to at least approximately minimize function $f_0(\hat{p})$. In particular, step 552 of sub-process 550 computes a step vector Δp̂ based on the current vector p̂ and the type of convex optimization selected. For a Newton step, step vector Δp̂ is given by Equation 16 where the current function $f_0(\hat{p})$ was selected in the last execution of step 540.

$$\Delta\hat{p} = -\nabla^2 f_0(\hat{p})^{-1} \nabla f_0(\hat{p}) \quad \text{Equation 16}$$

Step vector Δp̂ of Equation 16 if non-zero, generally indicates a direction of decrease in the function $f_0(\hat{p})$. If the step vector Δp̂ is zero, the current vector p̂ corresponds to a minimum of function $f_0(\hat{p})$, and sub-process 550 is complete. Decision step 554 determines whether the current vector p̂ is sufficiently close to the location of a minimum of the current function $f_0(\hat{p})$. For example, using the Newton step approach, step 554 can evaluate whether a scalar quantity $\lambda^2 = \nabla f_0(\hat{p})^T \nabla^2 f_0(\hat{p})^{-1} \nabla f_0(\hat{p})$ is less than a suitable threshold δ.

If the current vector p̂ is not sufficiently close to a minimum of function $f_0(\hat{p})$, sub-process 550 proceeds from decision step 554 to step 556 and chooses a step size s. Step size s is ideally selected to minimize function $f_0(\hat{p})$ along a line having direction defined by step vector Δp̂, and at least, step size s should be such that $f_0(\hat{p}+s\Delta\hat{p}) < f_0(\hat{p})$. A number of techniques are known for selecting the step size s. An exact line search, for example, solves for s such that $s = \arg\min_{u \geq 0} f_0(x + u\Delta\hat{p})$. Another technique, which commonly known as a backtracking line search, initially sets step size s equal to 1 and incrementally decreases step size s ($s = \beta s, \beta < 1$) while $f_0(\hat{p}+s\Delta\hat{p}) > f_0(\hat{p}) + \alpha s \nabla f_0(\hat{p})^T \Delta\hat{p}$ for a pre-selected positive parameter α less than 0.5. Once the step size s is chosen, step 558 updates the current vector p̂ by adding a step sΔp̂, before sub-process 550 branches back to step 552 to calculate a new step vector Δp̂.

If after calculation of step vector Δp̂, decision step 554 determines that vector p̂ is sufficiently close to the location of a minimum of function $f_0(\hat{p})$, sub-process 550 is complete, and process 500 branches to a decision step 560 to determine whether vector p̂ is sufficiently close to a minimum of the target function $f(\hat{p})$. One technique for determining whether the process has determined a sufficient approximation of the location of the minimum of function $f(\hat{p})$ is to evaluate a ratio of the number of constraints, i.e., the number N of symbols in the alphabet, and parameter t. When the ratio, N/t is small, e.g., less than some threshold ε, the function $f_0(\hat{p})$ should be sufficiently close to function $f(\hat{p})$ in the area of vector p̂, so that vector p̂ is a minimum of both functions. If stopping criterion is not met, process 500 branches from decision step 560 to a step 570 and increases the parameter t. In particular, step 570 can increase parameter t by a factor μ that is greater than 1, e.g., between 3 and 100 or more preferably between 10 and 20. Process 500 then jumps back to step 540 and selects a new function $f_0(\hat{p})$ based on the new value of parameter t and again executes sub-process 550 with the new function $f_0(\hat{p})$ and starting from vector p̂ as previously found.

When step 560 determines that vector p̂ is sufficiently close to a minimum of function $f(\hat{p})$, process 500 branches from step 560 to step 580 and estimates the input probability vector q(η) from the current vector p̂. In particular, the probability vector q(η) is expected to be approximately equal to $X^T\hat{p} + e_0$ when process 500 is complete.

Process 500 as described above generally uses a log-barrier technique for convex optimization with constraints. However, other optimization techniques are known for solving for or approximating a minimum of a convex function on a convex domain. For example, primal-dual interior-point methods might alternatively be employed for the optimization.

Whether an optimization process such as process 500 of FIG. 5 can provide superior denoising results when compared to the iterative projection process such as process 300 of FIG. 3 generally depends on the channel model (e.g., how close channel matrix Π is to being singular) and the specifics of the DUDE process (e.g., the size and type of neighborhoods.) For example, for Gaussian noise, the channel matrix Π is further from being singular for a larger signal to noise ratio (SNR), and convex optimization processes for determining the input distribution generally provide better denoising performance than do iterative projection processes in the high signal to noise regime, e.g., for a noise standard deviation σ below about 5 for when symbols are 8-bit values. On the other hand, an iterative projection process generally provides better performance in the very low signal-to-noise regime, e.g., for a noise standard deviation σ more than about 15 for when symbols are 8-bit values.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A denoising process comprising:
    scanning a noisy signal that represents a set of symbols to determine a first vector for a first context, wherein components of the first vector indicate empirical probabilities of the first context containing respective symbols in the noisy signal;
    performing a convex optimization process to identify a second vector such that a norm of a difference between the first vector and a product of the second vector and a channel matrix is minimized, wherein a result of applying of the channel matrix to symbols represented in a clean signal is statistically equal to the set of symbols represented by the noisy signal; and
    assembling a reconstructed signal by replacing occurrences of the symbols in the noisy signal having the first context with a second symbol that minimizes a distortion determined using the second vector to approximate characteristics of the clean signal.

2. The process of claim 1, wherein the convex optimization process finds as the second vector a vector p approximately identifying a location of a minimum of a function $f(p)$ satisfying $f(p)=\|p^T\Pi-m^T(\eta)\|_2^2$, where the first vector is equal to $m(\eta)$ and the channel matrix is $\Pi$.

3. The process of claim 2, wherein in the convex optimization process, components $p_{[\alpha]}$ of the vector p are subject to constraints $$p_{[\alpha]} \in [0, 1] \text{ and } \sum_{a \in A} p_{[a]} = 1$$

for $\alpha$ in an alphabet A of the symbols found in the clean signal.

4. The process of claim 1, wherein the convex optimization process comprises:
finding a vector $\hat{p}$ approximately identifying a location of a minimum of a function $f(\hat{p})$ satisfying $f(\hat{p})=\|(X^T\hat{p}+e_0)^T\Pi-m^T\|_2^2$, wherein the first vector is equal to m, the channel matrix is $\Pi$, X is an (N−1)×N matrix, and $e_0$ is a unit vector; and
determining the second vector from the vector $\hat{p}$.

5. The process of claim 4, wherein in the convex optimization process, components $\hat{p}_{[\alpha]}$ of the vector $\hat{p}$ are subject to constraints $$\hat{p}_{[a]} \in [0, 1] \text{ for } a \in A \setminus a_0 \text{ and } \sum_{a \in A \setminus a_0} \hat{p}_{[a]} \in [0, 1]$$

for an alphabet A of the symbols found in the clean signal and $\alpha_0$ a symbol in alphabet A.

6. The process of claim 4, wherein the second vector is $(X^T\hat{p}+e_0)$.

7. A computer readable medium containing instructions that when executed perform the process of claim 1.

8. A denoising system comprising:
a modeling unit capable of statistically processing a noisy signal to construct respective empirical data structures indicating for each of a plurality of contexts, occurrences of symbols that have the context and are in the noisy signal;
an optimization unit communicatively coupled to the modeling unit, wherein performs a convex optimization process having the empirical data structures as inputs and a minimization result indicating characteristics of a clean signal; and
a replacement unit communicatively coupled to the optimization unit, wherein the replacement unit operates to replace symbols in a first of the frames with values identified using the minimization result.

9. The system of claim 8, wherein:
the empirical data structures include a vector $m(\eta)$; and
the minimization result includes a vector p that the optimization unit finds by minimizing a function $f(p)$ satisfying $f(p)=\|p^T\Pi-m^T(\eta)\|_2^2$, where $\Pi$ is a channel matrix.

10. The system of claim 9, wherein in the convex optimization process, components $p_{[\alpha]}$ of the vector p are subject to constraints $$p_{[\alpha]} \in [0, 1] \text{ and } \sum_{a \in A} p_{[a]} = 1$$

for $\alpha$ in an alphabet A of the symbols found in the clean signal.

11. The system of claim 8, wherein the convex optimization process comprises:
the minimization result includes a vector $\hat{p}$ that the optimization unit finds by minimizing a function $f(\hat{p})$ satisfying $f(\hat{p})=\|(X^T\hat{p}+e_0)^T\Pi-m^T\|_2^2$, wherein the empirical data structures include a vector m, the channel matrix is $\Pi$, X is an (N−1)×N matrix, and $e_0$ is a unit vector; and
determining the second vector from the vector $\hat{p}$.

12. The system of claim 11, wherein in the convex optimization process, components $\hat{p}_{[\alpha]}$ of the vector $\hat{p}$ are subject to constraints $$\hat{p}_{[a]} \in [0, 1] \text{ for } a \in A \setminus a_0 \text{ and } \sum_{a \in A \setminus a_0} \hat{p}_{[a]} \in [0, 1]$$

for an alphabet A of the symbols found in the clean signal and $\alpha_0$ a symbol in alphabet A.

* * * * *